(12) United States Patent
Swift et al.

(10) Patent No.: US 7,927,749 B2
(45) Date of Patent: *Apr. 19, 2011

(54) MICROBIAL FUEL CELL AND METHOD

(75) Inventors: Joseph A. Swift, Ontario, NY (US);
Michael A. Butler, Webster, NY (US);
Stanley J. Wallace, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/874,295

(22) Filed: Sep. 2, 2010

(65) Prior Publication Data

US 2010/0330434 A1 Dec. 30, 2010

Related U.S. Application Data

(63) Continuation of application No. 12/164,186, filed on Jun. 30, 2008, now Pat. No. 7,807,303.

(51) Int. Cl.
*H01M 8/16* (2006.01)

(52) U.S. Cl. ........................................ 429/401

(58) Field of Classification Search .................... 429/401
See application file for complete search history.

(56) References Cited

U.S. PATENT DOCUMENTS

| | | | |
|---|---|---|---|
| 6,240,732 B1 | 6/2001 | Allan | 60/739 |
| 6,294,281 B1 | 9/2001 | Heller | 429/43 |
| 6,497,975 B2 | 12/2002 | Bostaph et al. | 429/38 |
| 6,500,571 B2 | 12/2002 | Liberatore et al. | 429/2 |
| 6,531,239 B2 | 3/2003 | Heller | 429/43 |
| 7,052,763 B2 | 5/2006 | Swift et al. | 428/300.4 |
| 7,160,637 B2 | 1/2007 | Chiao et al. | 429/2 |
| 2003/0138674 A1 | 7/2003 | Zeikus et al. | 429/2 |
| 2005/0031840 A1 | 2/2005 | Swift et al. | 428/292.1 |
| 2006/0019129 A1 | 1/2006 | Liu et al. | 429/12 |
| 2006/0147763 A1* | 7/2006 | Angenent et al. | 429/2 |
| 2007/0134520 A1 | 6/2007 | Shimomura et al. | 429/2 |
| 2007/0259217 A1* | 11/2007 | Logan | 429/2 |
| 2008/0280184 A1 | 11/2008 | Sakai et al. | 429/34 |
| 2009/0324998 A1* | 12/2009 | Swift et al. | 429/2 |

OTHER PUBLICATIONS

Article Re: "Application of Bacterial Biocathodes in Microbial Fuel Cells" by Zhen He, Largus T. Angenent, Electroanalysis 18, 2006, No. 19-20, pp. 2009-2015, Copyright 2006 WILEY-VCH Verlag GmbH & Co. KGaA, Weinheim.

Article Re :"An Upflow Microbial Fuel Cell with an Interior Cathode: Assessment of the Internal Resistance by Impedance Spectroscopy" by Zhen He, Norbert Wagner, Shelley D. Minteer, and Largus T. Angenent, Environmental Science & Technology/vol. 40, No. 17, 2006, pp. 5212-5217, Copyright 2006 American Chemical Society, Published on Web Jun. 29, 2006.

(Continued)

*Primary Examiner* — Patrick Ryan
*Assistant Examiner* — Brent Thomas
(74) *Attorney, Agent, or Firm* — Alix, Yale & Ristas, LLP

(57) ABSTRACT

A microbial fuel cell includes a cell housing having first and second chambers. The first chamber is adapted for containing a fluid including a biomas. The second chamber is adapted for containing an oxygenated fluid. A cathode extends into the cell housing second chamber and an anode segment of an electrode assembly extends into the cell housing first chamber. The electrode assembly has multiple, substantially aligned, fibers. The outer surfaces of the fibers of the anode segment are adapted for receiving a biofilm.

19 Claims, 4 Drawing Sheets

OTHER PUBLICATIONS

Article Re: "Utilizing the green alga *Chlamydomonas reinhardtii* for microbial electricity generation: a living solar cell" (Biotechnological Products and Process Engineering), by Miriam Rosenbaum, Uwe Schroder and Fritz Scholz, Institut fur Chemie und Biochemie, Universitat Greifswald, Soldmannstrasse 16, Greifswald, 17489, Germany, Published online Feb. 5, 2005, pp. 753-756.

Article Re: "Heat treated soil as convenient and versatile source of bacterial communities for microbial electricity generation" by Juliane Niessen, Falk Harnisch, Miriam Rosenbaun, Uwe Schroder, and Fritz Scholz, Institute of Chemistry and Biochemistry,Univeristy of Greifswald, Soldmannstrasse 16, 17489 Greifswald, Germany, Copyright 2006, Elsevier B.V., www.sciencedirect.com, pp. 869-873.

Article Re: "Increased power production from a sediment microbial fuel cell with a rotating cathode" by Zhen He, Haibo Shao, and Largus T. Angenent, Copyright 2007 Elsevier B.V., Science Direct, Biosensors and Bioelectronics 22 (2007), www.sciencedirect.com, pp. 3252-3255.

\* cited by examiner

MICROBIAL FUEL CELL AND METHOD

Cross-Reference to Related Applications

This application is a continuation of U.S. Pat. application Ser. No. 12/164,186 filed Jun. 30, 2008 now U.S. Pat. No. 7,807,303.

BACKGROUND

This disclosure relates generally to fuel cells and methods of their manufacture and use. More particularly, the present disclosure relates to fuel cells capable of operation by electrolyzing compounds in a biological system and methods of their manufacture and use.

There has long been interest in techniques for providing electrical power from a power source that utilizes biological matter freely available in the environment. One such area of interest is in developing microbial fuel cells (MFCs) as a means to treat wastewater more efficiently by breaking down organic waste products and converting the energy of their chemical bonds into electricity and hydrogen. According to the May 2004 issue of Environmental Science & Technology, 46 trillion liters of household wastewater are treated annually in the United States at a cost of $25 billion. Importantly, the electricity required—mostly for aeration—constitutes 1.5% of the electricity used in the nation. Other nations have similar statistics.

Recently, researchers have shown the feasibility of using microbial fuel cells to generate electricity wherein the source of electricity is the chemical energy contained in the bonds of organic compounds which are a principle constituent of wastewater. Using laboratory scale microbial fuel cell reactors comprising a special anode, a simple cathode and a suitable proton exchange membrane (PEM) to separate the wet anode and cathode portions of the microbial fuel cell, energy densities in the order of 30 watts/cubic meter have been generated.

The process uses bacteria, living in biofilms on the special anode, to break down the organics, separating electrons from protons. These electrons and protons then travel to the cathode, the former via an external wire, the latter by diffusing through the electrolyte which is generally a substance that does not conduct electricity readily. In the electricity-generating microbial fuel cells, the protons and electrons combine at the cathode with oxygen to form water. This consumption of the electrons allows more electrons to keep flowing from the anode to the cathode as long as there is a source of chemical bonds (i.e. organic waste) to fuel the reaction.

The first microbial fuel cells produced between 1 and 40 milliwatts of power per square meter ($mW/m^2$) of anode electrode surface area. In the past year researchers have been able to increase this more than 10 fold by demonstrating that they could generate power in the range of up to 500 $mW/m^2$ using domestic wastewater and 1,500 $mW/m^2$ with a surrogate for waste water comprising glucose and air. Demonstration of these latter power densities has encouraged much discussion about the technical requirements to enable profitable commercial power production. In brief, improvements to the output power density by another factor of at least 10 will be required in order to make the technology attractive on a commercial scale.

Today, scale-up for commercial uses has several challenges. For example, the current laboratory-scale prototypes use materials that aren't sturdy or robust enough to be used in a commercial system. Further, experimental microbial fuel cells are presently small in size and would need to be much bigger (to compensate for the low power density), undoubtedly and unfortunately this would greatly increase the distance between anode and cathode which would slow diffusion of hydrogen from the former to the latter, further damping efficiency. To be competitive, the power density must more than double the maximum achieved so far i.e. 8,500 $mW/m^2$.

SUMMARY

There is provided a microbial fuel cell comprising a cell housing defining first and second chambers. The first chamber is adapted for containing a fluid including a biomas. The second chamber is adapted for containing an oxygenated fluid. A cathode extends into the cell housing second chamber and an anode segment of an electrode assembly extends into the cell housing first chamber. The electrode assembly has multiple, substantially aligned, fibers. The anode segment extends from the first end of the fibers to an intermediate location disposed between the first and second ends of the fibers. The outer surfaces of the fibers of the anode segment are adapted for receiving a biofilm.

The electrode assembly also includes a bound segment extending from the second end of the fibers to the intermediate location. The outer surfaces of the fibers of the bound segment are impregnated or encased with a binder.

The microbial fuel cell further comprises a seal device disposed intermediate the bound segment and the cell housing. Together, the bound segment, seal device and cell housing defining a fluid-tight boundary.

A protein exchange membrane disposed within the cell housing divides the cavity into the first and second chambers.

The microbial fuel cell further comprises a first chamber inlet adapted for receiving a first fluid stream containing a biomass and a first chamber outlet adapted for discharging the first fluid stream. At least one second chamber inlet is adapted for receiving a second fluid stream containing oxygen and at least one second chamber outlet is adapted for discharging the second fluid stream. The fluid may be a gas or a liquid or a mixture thereof.

The electrode assembly may have a cylindrical-shape, with the bound segment forming the cell housing and the anode segment extending radially inward from the bound segment. A cylindrical-shaped protein exchange membrane is disposed intermediate the cathode and the anode segment, the membrane dividing the cavity into the first and second chambers.

The microbial fuel further comprises at least one first chamber inlet adapted for receiving a first fluid stream containing a biomass and at least one first chamber outlet adapted for discharging the first fluid stream. The first chamber inlet and outlet each define an angle with the electrode assembly whereby the first fluid stream generates a circular flow of the fluid in the first chamber. At least one second chamber inlet is adapted for receiving a second fluid stream containing oxygen and at least one second chamber outlet is adapted for discharging the second fluid stream.

The fuel cell may include a plurality of first chamber inlets and outlets located at intervals along the electrode assembly.

The diameter of the first chamber inlet port may be greater than the diameter of the first chamber outlet port.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

With reference to the drawings wherein like numerals represent like parts throughout the several figures, a microbial fuel cell in accordance with the present disclosure is generally designated by the numeral 10, 10'. As used herein, the term "fiber" refers to non-metallic, fibers which exhibit a desired level of electrical conductivity. The term "binder", "binder resin", or "resin" as used herein refers to a matrix material that retains the fibers in place and may provide for one or more mechanical or structural features. The term "biomas" as used herein refers to any organic matter from which electrons and protons may be separated when the organic matter is suspended or dissolved in a liquid. The term "biofilm" as used herein refers to any agent or catalyst that can separate electrons and protons from a biomas.

Figure 1:
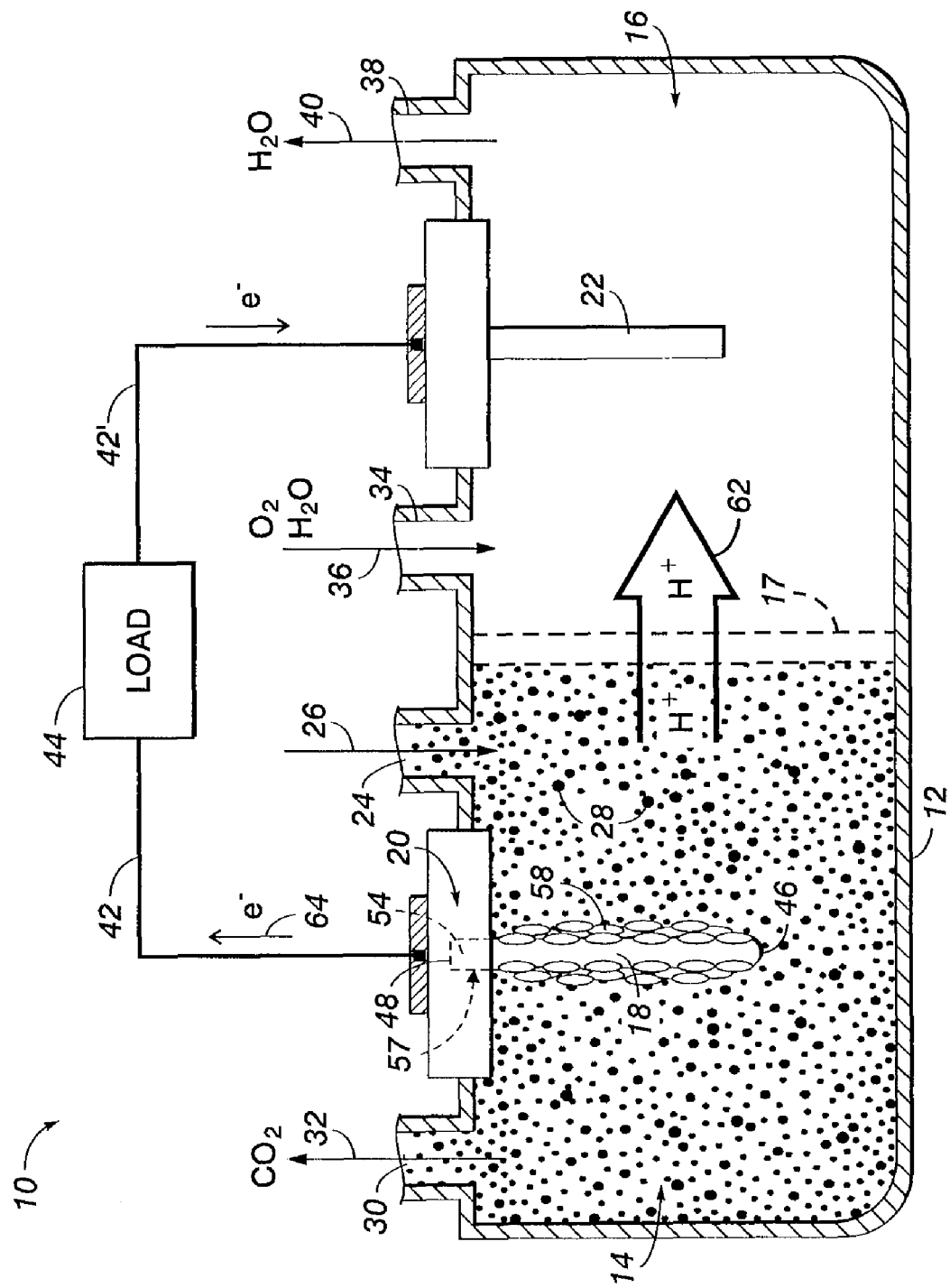
FIG. 1 is schematic diagram of a first embodiment of a microbial fuel cell in accordance with the disclosure.

FIG. 1 is schematic diagram of a first embodiment of a microbial fuel cell 10 in accordance with the disclosure. The cell housing 12 is divided into first and second chambers 14, 16 by a protein exchange membrane 17. The anode segment 18 of an electrode assembly 20 extends downwardly into the interior of the first chamber 14 and the cathode 22 extends downwardly into the interior of the second chamber 16. The first chamber inlet 24 is connected to a wastewater source (not shown) for receiving a wastewater flow stream 26 containing waste biomass 28. The first chamber outlet 30 discharges the treated wastewater 32 from the first chamber 14. The second chamber inlet 34 is connected to freshwater source for receiving an oxygenated freshwater flow stream 36. The second chamber outlet 38 discharges the oxygen depleted freshwater 40 from the second chamber 16. It should be appreciated that the discharged freshwater 40 may be oxygenated and recycled to the second chamber inlet 34. Alternatively, an oxygen source (not shown) can be incorporated as an inlet 34 to the second chamber 16 and fed as a gas stream into the fluid contained in that chamber 16. The protein exchange membrane 17 separating the first and second chambers 14, 16 prevents the relatively large oxygen molecules present in the second chamber 16 from diffusing into the first chamber 14, while allowing passage of proteins and hydrogen molecules. It also keeps solids that may be present in the wastewater stream 26 within the first chamber 14 of the cell 10. Electrical conductors 42, 42' extending from the electrode assembly 20 and cathode 22 are connected to a load 44, completing an electrical circuit as described below. The loads 44 powered by the microbial fuel cell may include the pumps providing the flow of wastewater and freshwater, for example.

Figure 2:
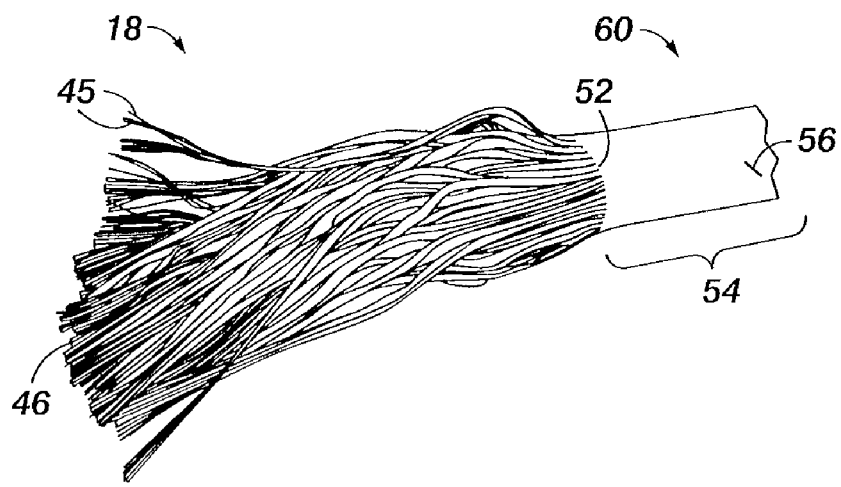
FIG. 2 is an enlarged perspective view of the electrode assembly of the microbial fuel cell of FIG. 1.

Referring to FIG. 2, the rod-shaped electrode assembly 20 comprises multiple aligned fibers 45 extending from a first end 46 to a second end 48. A first, anode segment 18 extends from the first end 46 to an intermediate location 52 disposed between the first and second ends 46, 48, and a second, bound segment 54 extends from the intermediate location 52 to the second end 48. In the bound segment 54, the fibers 45 are impregnated or encased with a suitable binder resin 56. In the anode segment 18, the fibers 45 are substantially unbound and extend freely from the bound segment 54. As used herein, "unbound" fibers are fibers that are not impregnated or encased by a binder, whereby the outer surface of each unbound fiber may be coated by a biofilm along the unbound length of fiber. The large surface areas of the free or unbound fibers 45 in the anode segment 18 become coated with a biofilm 58 during operation of the microbial fuel cell 10. A chemical reaction between bacteria in the biofilm 58 and biomas 28 in the wastewater stream 26 reduces the biomas 28, and in so doing produces electricity.

Typically, there are many small diameter, large surface area fibers 45. they can number from 2 fibers to many millions, for example 100,000,000 individual fibers 45. Each of the fibers 45 has a diameter that is typically in the range of about 0.1 to 100 microns. The free length of the portions of the fibers 45 in the anode segment 18 range from about 1 cm to 100, or more meters.

Non-limiting examples of fibers 45 to be used are filled or unfilled textile fibers such as polyester, rayon, polypropylene and nylon composite fibers containing appropriate conductive fillers such as carbon black, carbon nanotubes, quaternary ammonium compounds, boron nitride, ionic salts and short lengths of conductive fibers. In many cases the fibers are required to have a high tensile and/or bending strength. One suitable fiber comprises a plurality of carbon fibers and is known as CarbonConX™ (Xerox Corp.). When combined with a binder resin, the carbon fibers can comprise carbon nano-filaments, each made from a single or multiwalled carbon nanotube (CNT) strand.

The multiple-segment electrode assembly 20 may be made by modification of any suitable, commercial pultrusion, or molding, or compositing process, which combine continuous strands of carbon fiber 45 with a binder resin 56 to form a fiber-rich composite 60. Upon regular interruption or shuttering of the resin flow to the fiber mass entering for example the pultrusion tooling where resin impregnation would generally occur, the fiber 45 does not combine with the resin 56 and a length of dry fiber progresses into, through, and out of the process. Thus, along the length of continuous fiber 45 would exist regularly spaced resin impregnated segments separated by dry fiber segments that could be cut to form the electrode configuration shown in FIG. 2.

The binder 56 can be a polymer, ceramic, glass, or another suitable binder. The binder 56 usually is a thermoplastic or thermoset polymer that binds the fibers together with the necessary mechanical strength. A binder 56 that does not affect the resistance properties of the fibers 45 typically is selected. Suitable polymers include but are not limited to acrylics, polyesters, polyamide, polyamide, polystyrene, polysulphone, and epoxies.

Since the bound segment 54 of the electrode assembly 20 is solid, it can serve as a liquid or fluid seal by integration with a seal device 57 disposed between the bound segment and the wall of the cell 10. A portion of the bound segment 54 may be coated with a suitable metal, such as gold, copper, nickel, tin, tin/lead and the like, by any suitable coating means; including electrolysis plating, electrolytic plating, vacuum, gas, or other deposition, and the like, and, may contain mechanical features such as a post, pin, spade, hole, and the like to serve as an interconnection with conventional wiring 42 or other circuit members of general use in a power circuit.

As discussed above, the anode segment 18 of the electrode assembly 20 comprises a high surface area fibrous surface that in operation becomes coated with a biofilm 58. The biofilm 58 may comprise iron-reducing bacteria called cytochromes which are specialized enzymes known to transfer electrons to other proteins. In general however bacteria from the waste stream collects upon the anode segment forming a biofilm 58 with conductive properties. The interaction of the biomas 28, the bacteria of the biofilm 58, and the anode segment 18 creates a source of electricity. In electricity-generating microbial fuel cells 10, 10', the protons 62 that flow through the electrolyte-membrane 17 and electrons 64 flowing through the external circuit 42, 44, 42' combine at the cathode 22 with oxygen carried by the oxygen-water stream 36 to form more water molecules. This consumes the available electrons 64 allowing more to keep flowing from the anode segment 18 to the cathode 22 through the circuit 42, 44, 42' permitting energy to be harvested in the circuit.

Research has shown that conventional microbial fuel cells suffer from low power density, with electron transfer from the biofilm to the anode being very slow. This low power density limited the amount of electricity that could be generated by the microbial fuel cell. Power production could not be increased satisfactorily by merely scaling up the size of the microbial fuel cell. Since power density is primarily a function of the interface between the biofilm microbes and the anode surface, it did not appear that this deficiency could be resolved without modifying the characteristics of the biofilm. However, the free or unbound fibers 45 in the anode segment 18 provide a significant increase in available surface area, compared to conventional microbial fuel cell anodes, without scaling up the size of the microbial fuel cell 10, 10'.

It should be appreciated that the thickness of the biofilm layer is an important factor in determining the power density of a microbial fuel cell. If the biofilm is too thick the electrons have to travel too far to reach the anode segment, and if it is too thin there are too few bacteria participating in the energy producing reactions. Low power density results in both cases. In the embodiment 10' shown in FIGS. 3-5, an optimum thickness for the biofilm 58 is maintained by directing the flow 98 of wastewater relative to the anode segment 68 such that a relatively small portion of the wastewater flow 98 enters the gaps 70 (FIG. 6) between the separate fibers 72, thereby replacing the wastewater that has been depleted of biomas, and the major portion of the wastewater flow 98 moves past the surface 74 of the anode segment 68, thereby creating a shear force that removes those portions of the biofilm 58 that exceed the desired thickness.

The above-described flow pattern is achieved by utilizing a rod-in-cylinder cell design where the electrode assembly 76 has a cylindrical-shape, the cathode 22 is an axially extending rod positioned on the axis 78 of the electrode assembly 76, and a cylindrical-shaped protein exchange membrane 80 disposed between the cathode 22 and the electrode assembly 76 divides the microbial fuel cell into first and second chambers 82, 84. Similar to the first embodiment 10, the first chamber 82 has at least one inlet 86 and at least one outlet 88 for receiving and discharging, respectively, a wastewater flow stream 26 containing waste biomass 28, and the second chamber 84 has an inlet 92 for receiving an oxygenated freshwater flow stream 36 and an outlet 94 for discharging an oxygen depleted freshwater flow 40.

Figure 3:
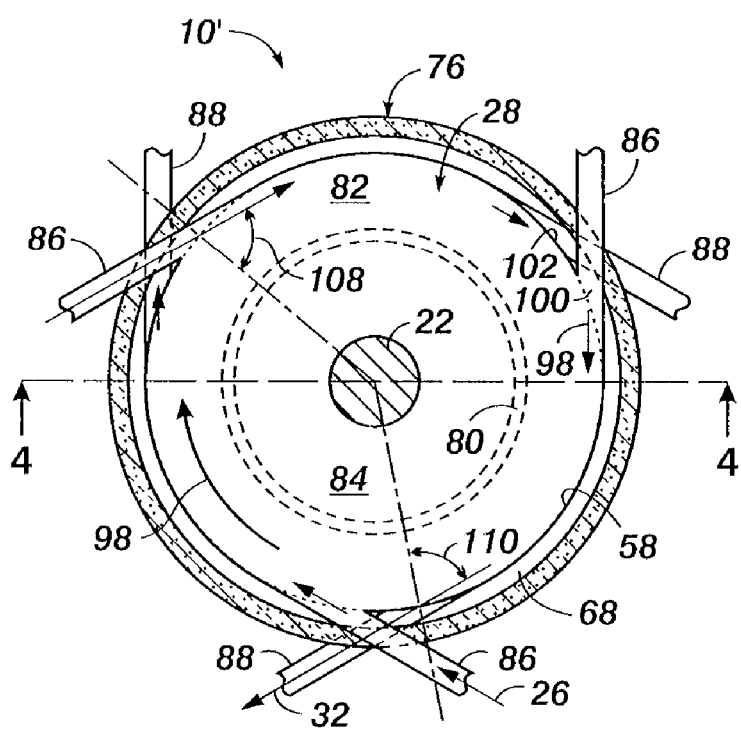
FIG. 3 is a simplified cross-sectional view of a second embodiment of a microbial fuel cell in accordance with the disclosure.
Figure 4:
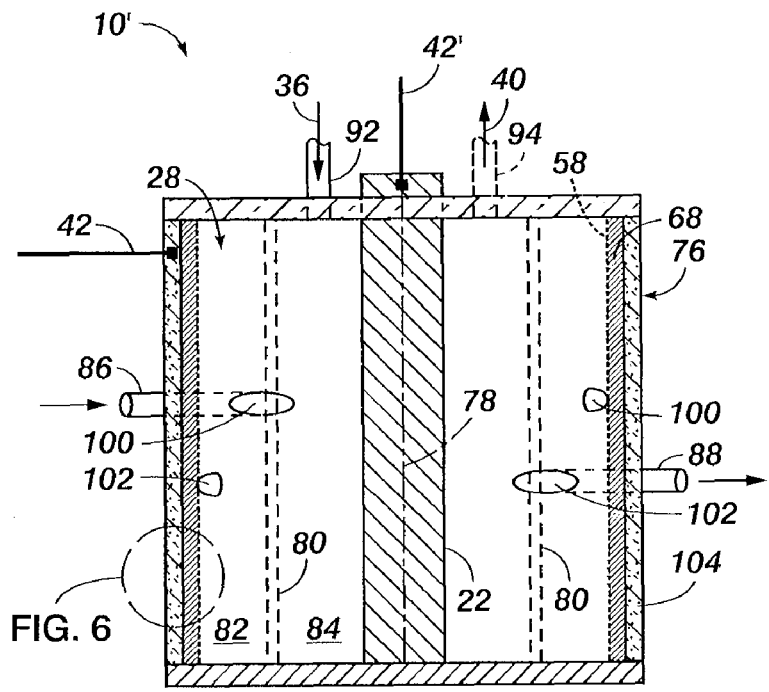
FIG. 4 is a cross-sectional view taken along line 4-4 of FIG. 3.
Figure 5:
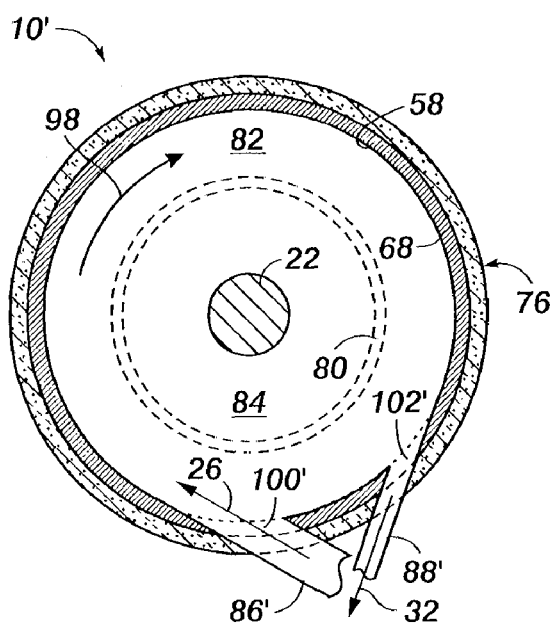
FIG. 5 is a simplified cross-sectional view of a variation of the microbial fuel cell of FIG. 3.
Figure 6:
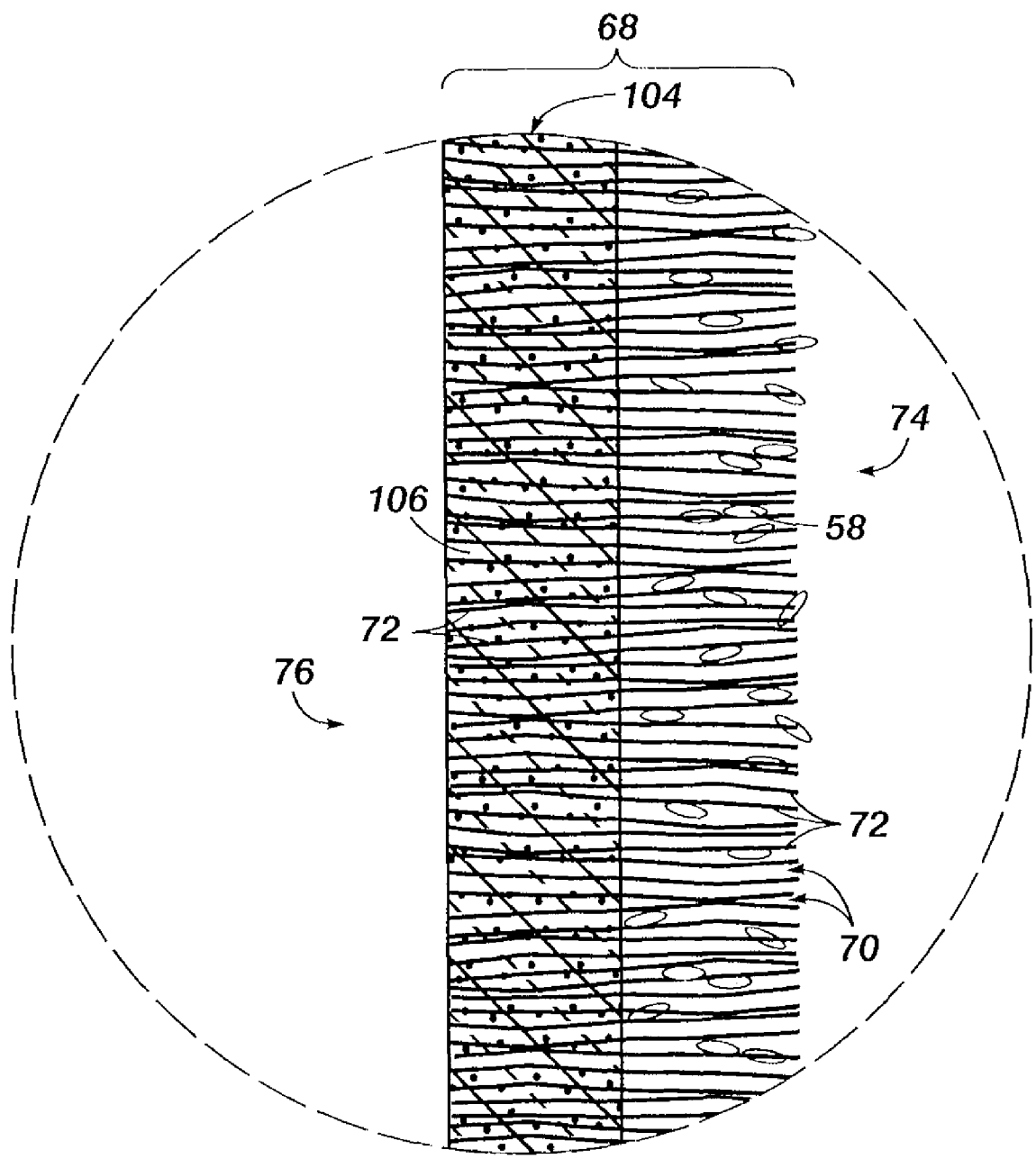
FIG. 6 is an enlarged view of area VI of FIG. 4.

To provide the effect of a large mass of wastewater moving across the surface of the anode segment 68, the inlet 86 and outlets 88 for the wastewater stream 26, 32 are configured within the electrode assembly 76 at an appropriate angle 108, 110 so as to impose a circular flow of the fluid stream 98 while it is contained within the microbial fuel cell 10'. In the variation of FIGS. 3 and 4, multiple inlet ports 100 and outlet ports 102 are located at intervals along the electrode assembly 76 to enable a sufficient total fluid flow. In the variation of FIG. 5, the inlet port 100' has a diameter that is larger than the diameter of the outlet port 102', thereby assuring a pressure difference between inlet 86' and outlet 88' to enable a sufficient fluid flow.

As stated above, the electrode assembly 76 forms the outer wall of the microbial fuel cell 10'. With additional reference to FIG. 6, the electrode assembly has a cylindrical shape with an outer bound segment 104 and an inner anode segment 68. Similar to the first embodiment 10, the fibers 72 are impregnated or encased with a suitable binder resin 106 in the bound segment 104. In the anode segment 68, the fibers 72 extend in a radial direction perpendicular or nearly perpendicular to the bound segment 104. The surface areas of the free or unbound fibers 72 in the anode segment 68 become coated with biofilm 58 during operation of the microbial fuel cell 10'.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A microbial fuel cell comprising:
a cell housing defining first and second chambers, the first chamber being adapted for containing a fluid including a biomas, the second chamber being adapted for containing an oxygenated fluid;
a cathode extending into the cell housing second chamber; and
an electrode assembly having a plurality of substantially aligned fibers, each of the fibers extending from a first end to a second end and having an outer surface, the electrode assembly including an anode segment and a bound segment, the anode segment extending from the first end of the fibers to an intermediate location disposed between the first and second ends of the fibers the bound segment extending from the second end of the fibers to the intermediate location, the anode segment extending into the cell housing first chamber, the outer surfaces of the fibers of the anode segment being adapted for receiving a biofilm, the outer surfaces of the fibers of the bound segment being impregnated with a binder.

2. The microbial fuel cell of claim 1 wherein the electrode assembly has between 100 and 100,000,000 fibers.

3. The microbial fuel cell of claim 2 wherein the electrode assembly has between 500 and 300,000 fibers.

4. The microbial fuel cell of claim 1 wherein the fibers have a diameter that is between 0.1 and 100 microns.

5. The microbial fuel cell of claim 1 wherein the anode segment extends from 1 cm to 100 meters from the bound segment.

6. The microbial fuel cell of claim 1 further comprising a seal device disposed intermediate the bound segment and the cell housing, the bound segment, seal device and cell housing defining a fluid-tight boundary.

7. The microbial fuel cell of claim 1 further comprising a membrane disposed within the cell housing, the membrane dividing the cavity into the first and second chambers.

8. The microbial fuel cell of claim 7 further comprising
a first chamber inlet adapted for receiving a first fluid stream containing a biomass and a first chamber outlet adapted for discharging the first fluid stream; and
a second chamber inlet adapted for receiving a second fluid stream containing oxygen and a second chamber outlet adapted for discharging the second fluid stream.

9. The microbial fuel cell of claim 1 wherein the electrode assembly has a cylindrical-shape, the bound segment forming the cell housing and the anode segment extending radially inward from the bound segment, the cathode being disposed within a cavity defined by the electrode assembly.

10. The microbial fuel cell of claim 9 further comprising a cylindrical-shaped membrane disposed within the cavity intermediate the cathode and the anode segment, the membrane dividing the cavity into the first and second chambers.

11. The microbial fuel cell of claim 10 further comprising
at least one first chamber inlet adapted for receiving a first fluid stream containing a biomass and at least one first chamber outlet adapted for discharging the first fluid stream, the first chamber inlet and outlet each defining an angle with the electrode assembly whereby the first fluid stream generates a circular flow of the fluid in the first chamber; and
at least one second chamber inlet adapted for receiving a second fluid stream containing oxygen and at least one second chamber outlet adapted for discharging the second fluid stream.

12. The microbial fuel cell of claim 11 wherein the fuel cell comprises a plurality of first chamber inlets and a plurality of first chamber outlets located at intervals along the electrode assembly.

13. The microbial fuel cell of claim 11 wherein the first chamber inlet and outlet each have a diameter, the diameter of the first chamber inlet port being greater than the diameter of the first chamber outlet port.

14. The microbial fuel cell of claim 9 wherein the fibers of the anode segment extend in a radial direction substantially perpendicular to the bound segment.

15. A microbial fuel cell comprising:
a cell housing;
a membrane disposed within the cell housing, the membrane dividing the housing into first and second chambers, the first chamber being adapted for containing a fluid including a biomas, the second chamber being adapted for containing an oxygenated fluid;
a cathode extending into the cell housing second chamber; and
an electrode assembly having a plurality of substantially aligned fibers, each of the fibers extending from a first end to a second end and having an outer surface, the electrode assembly including an anode segment and a bound segment, the anode segment extending from the first end of the fibers to an intermediate location disposed between the first and second ends of the fibers, the bound segment extending from the second end of the fibers to the intermediate location, the outer surfaces of the fibers of the anode segment being adapted for receiving a biofilm, the outer surfaces of the fibers of the bound segment being impregnated or encased with a binder.

16. The microbial fuel cell of claim 15 wherein the electrode assembly has a cylindrical-shape defining an axis, the bound segment forming the cell housing and the anode segment extending radially inward from the bound segment, the cathode being substantially disposed on the axis of the electrode assembly and the membrane being disposed intermediate the anode segment and the cathode.

17. The microbial fuel cell of claim 16 further comprising:
a least one first chamber inlet adapted for receiving a first fluid stream containing a biomass and at least one first chamber outlet adapted for discharging the first fluid stream, the first chamber inlet and outlet each have a diameter, the diameter of the first chamber inlet port being greater than the diameter of the first chamber outlet port, the first chamber inlet and outlet each defining an angle with the electrode assembly whereby the first fluid stream generates a circular flow of the fluid in the first chamber; and
at least one second chamber inlet adapted for receiving a second fluid stream containing oxygen and at least one second chamber outlet adapted for discharging the second fluid stream.

18. The microbial fuel cell of claim 16 further comprising:
a plurality of first chamber inlets adapted for receiving a first fluid stream containing a biomass and a plurality of first chamber outlets adapted for discharging the first fluid stream, the first chamber inlets and outlets being located at intervals along the electrode assembly, the first chamber inlets and outlets each defining an angle with the electrode assembly whereby the first fluid stream generates a circular flow of the fluid in the first chamber; and
a second chamber inlet adapted for receiving a second fluid stream containing oxygen and a second chamber inlet adapted for discharging the second fluid stream.

19. The microbial fuel cell of claim 15 wherein the fibers of the anode segment extend in a radial direction substantially perpendicular to the bound segment.

* * * * *